(12) United States Patent
Sheu

(10) Patent No.: US 7,809,163 B2
(45) Date of Patent: Oct. 5, 2010

(54) METHOD FOR PROHIBITING A PERSON WITH A FACIAL MASK TO OPERATE AN AUTOMATIC TELLER MACHINE

(75) Inventor: Yih-Ran Sheu, Tainan (TW)

(73) Assignee: Southern Taiwan University, Tainan County (TW)

( * ) Notice: Subject to any disclaimer, the term of this patent is extended or adjusted under 35 U.S.C. 154(b) by 33 days.

(21) Appl. No.: 12/385,336

(22) Filed: Apr. 6, 2009

(65) Prior Publication Data
US 2009/0251278 A1 Oct. 8, 2009

Related U.S. Application Data

(63) Continuation-in-part of application No. 11/020,101, filed on Dec. 27, 2004, now abandoned.

(51) Int. Cl.
*G06K 9/00* (2006.01)
(52) U.S. Cl. .................. 382/103; 382/115; 382/118
(58) Field of Classification Search .......... 382/103, 382/115, 118; 348/143; 902/1, 2, 3, 4, 5, 902/6, 7, 8
See application file for complete search history.

(56) References Cited

U.S. PATENT DOCUMENTS

| 6,529,617 B1 * | 3/2003 | Prokoski | ............... 382/128 |
| 2002/0136435 A1 * | 9/2002 | Prokoski | ............... 382/118 |
| 2006/0187305 A1 * | 8/2006 | Trivedi et al. | ............... 348/169 |

* cited by examiner

*Primary Examiner*—Brian Q Le
(74) *Attorney, Agent, or Firm*—Rosenberg, Klein & Lee

(57) ABSTRACT

A method for prohibiting a person with a facial mask to operate an automatic teller machine essentially includes the followings steps of: a) arranging a visual spectrum camera and an alarm unit approaching an automatic teller machine (ATM); b) capturing a facial picture of an experimental subject via the camera; c) judging if the picture performs generic facial features of a human face; if false, proceed Step g); d) if true, a facial temperature of the subject is detected to gain a measured temperature; e) comparing the measured temperature with a predetermined reference temperature; if the measured temperature is not within the reference temperature range, a spurious human face is determined and Step g) goes on; f) if the measured temperature is within the reference temperature range, a genuine human face is determined and the ATM is allowably operated without proceeding Step g); and g) activating the alarm unit to transmit a warning signal without operating the ATM.

6 Claims, 3 Drawing Sheets

METHOD FOR PROHIBITING A PERSON WITH A FACIAL MASK TO OPERATE AN AUTOMATIC TELLER MACHINE

This application is a continuation in part of my application filed Dec. 27, 2004, Ser. No. 11/020,101, now abandoned.

BACKGROUND OF THE INVENTION

1. Field of the Invention

The present invention pertains to a method for prohibiting a person with a facial mask to operate an automatic teller machine, in particular to one which applies to an automatic teller machine by identifying a genuine human face based on an image analysis in conjunction with the temperature of the human face.

2. Description of the Related Art

It is usual that a bank usually arranges multiple automatic teller machines (so called ATMs) to serve its clients. However, the ATM with a deposit of considerable money is usually unattended and facilely becomes a perfect target for the outlaw. Assume that a security system adapted to the ATM is sufficient to identify the outlaw, the possibility of the loot ATM might be minimized.

With regard to the current security system, 24H videotape to monitor the ATM is usually made available to help the police solve the case while the ATM is broken-in. Whereas, the difficulty attendant with the operation of the security system is that the videotaped image would be rendered useless for failing to clearly identify the look or appearance of the outlaw if the outlaw wears a mouth mask or a helmet.

An improvement is made by the present inventor to provide an image identification means by judging if the ATM user gives the facial features.

If yes, the user is authorized to use the ATM; if not, the alarm process is activated to trigger the protection procedure that intends to identify if the user is a legal one and thus to frustrate the criminality. However, if the outlaw wears a facial mask, he or she may fool the detection of facial features. The security system still fails to identify facial features of the outlaw from the image identification.

Commonly, in view of the human being maintains constant body temperature, the temperature of his/her face that belongs to a part of the human body is also close to the body temperature. Since the mask is not part of the human body, temperature thereof close to the ambient temperature would somewhat distinguish from the body temperature of a human being. Taking advantage of this difference, the inventor of the present invention excludes the possibility of fooling the detection due to the facial mask wearing and promotes to identify a legal subject by applying an image identification accompanying with the measurement of body temperature.

As an example of a conventional facial identification, U.S. Pat. No. 6,529,617 mainly discloses a security system to serve identification via a thermal image associated with a medical image. Such system essentially establishes the identification of the facial features by the thermal image constructed of complex thermal conditions. It is known to be applicable in a closed place, for instance applied for recognizing some patients with special diseases in a hospital. Even through the conventional system requires high cost, it still allowably contributes to the concern of the control of the disease infection.

As a further example of a conventional identification, U.S. Patent Publication No. 2002/0136435 teaches a dual band biometric identification system which applies a visual camera and an IR camera to respectively record the optical and infrared (thermal) images of experimental subjects. According to the cross validations between those recorded images and currently pre-saved targets in the data, this system accurately conduces to identifying if the experimental subject fits with the target reference in the data.

The aforementioned two conventional inventions primarily serve as "key" identifications adapted to a closed place and both take advantage of dual inspecting systems to promote the accuracy. It is believed that they may require higher cost and complex equipments as well as algorithm, whereas such complex identification is unable to be well adapted for the ATM provided with a "threshold" facial identification.

Furthermore, with respect to the current ATM circumstance, it is well known to install visual cameras around the ATMs and the infrared detecting device therearound for turning on a luminous means while sensing ATM users, but it fails to combine the afore equipments to identify the genuine human face.

SUMMARY OF THE INVENTION

Therefore, the primary objective of the present invention is to provide a method for prohibiting a person with a facial mask to operate an automatic teller machine by accurately identifying a genuine human face so as to prevent the occurrence of fooling the identification and avoid the peculation of the outlaw with a mask.

The method in conformity with the present invention comprises the following steps of:

a) arranging a visual spectrum camera and an alarm unit approaching an automatic teller machine (ATM);

b) capturing a facial picture of an experimental subject via the camera;

c) judging if the picture shows generic features of a human face; if the face features are recognized as false, it then directly proceeds Step g);

d) if the face features are recognized as true, a facial temperature of the subject is thence detected to gain a measured temperature;

e) comparing the measured temperature with a predetermined reference temperature; if the measured temperature resulting from the comparison fails to be within a range of the reference temperature, it is determined as a spurious human face and then directly proceeds Step g);

f) if the measured temperature resulting from the comparison is within the range of the reference temperature, it is determined as a genuine human face and the ATM is allowably operated without proceeding Step g); and g) triggering the alarm unit to transmit a warning signal without operating the ATM.

Accordingly, the present invention takes advantage of capturing visual images for permitting a computer to identify whether the subject picture provides with features of a genuine human face and further to detect the temperature of the features so as to efficiently prevent the outlaw with a mask from looting. Therefore, it is applicable to apply the current means or the combination of the current means with components in lower cost associated with the present method for attaining the accurate identification.

DETAILED DESCRIPTION OF THE PREFERRED EMBODIMENTS

The advantages of the present invention over the known prior arts will become more apparent to those of ordinary skilled in the art by reading the following descriptions with the relating drawings.

Figure 1:
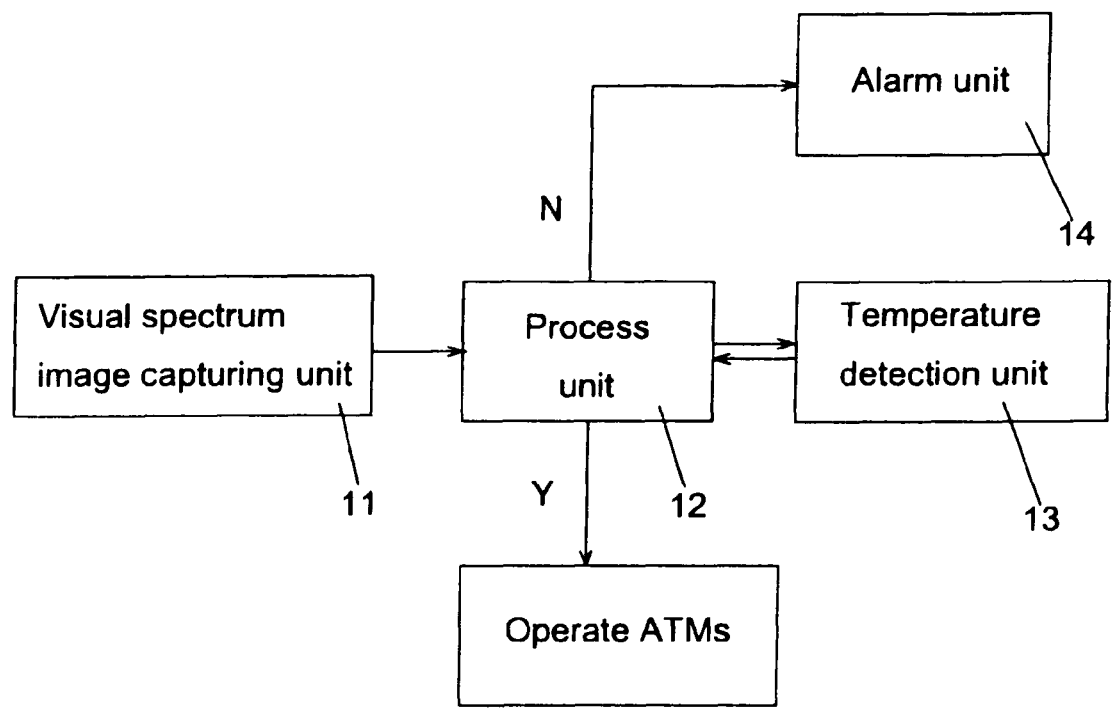
FIG. 1 is a schematic view showing a method for prohibiting a person with a facial mask to operate an automatic teller machine according to a preferred embodiment of the present invention.

Referring to FIG. 1 shows a method for prohibiting a person with a facial mask to operate an automatic teller machine according to a preferred embodiment of the present invention, so that the ATM could serve to automatically detect whether an experimental subject or an ATM user is legally authorized. Wherein, identification means adapted to the method of the present invention essentially comprise a visual spectrum image capturing unit 11 to catch facial pictures, a process unit 12 to process the captured pictures acquired from the visual spectrum image capturing unit 11, a temperature detection unit 13 to receive commands transmitted from the process unit 12, and an alarm unit 14 electrically connected with the process unit 12.

Figure 2A:
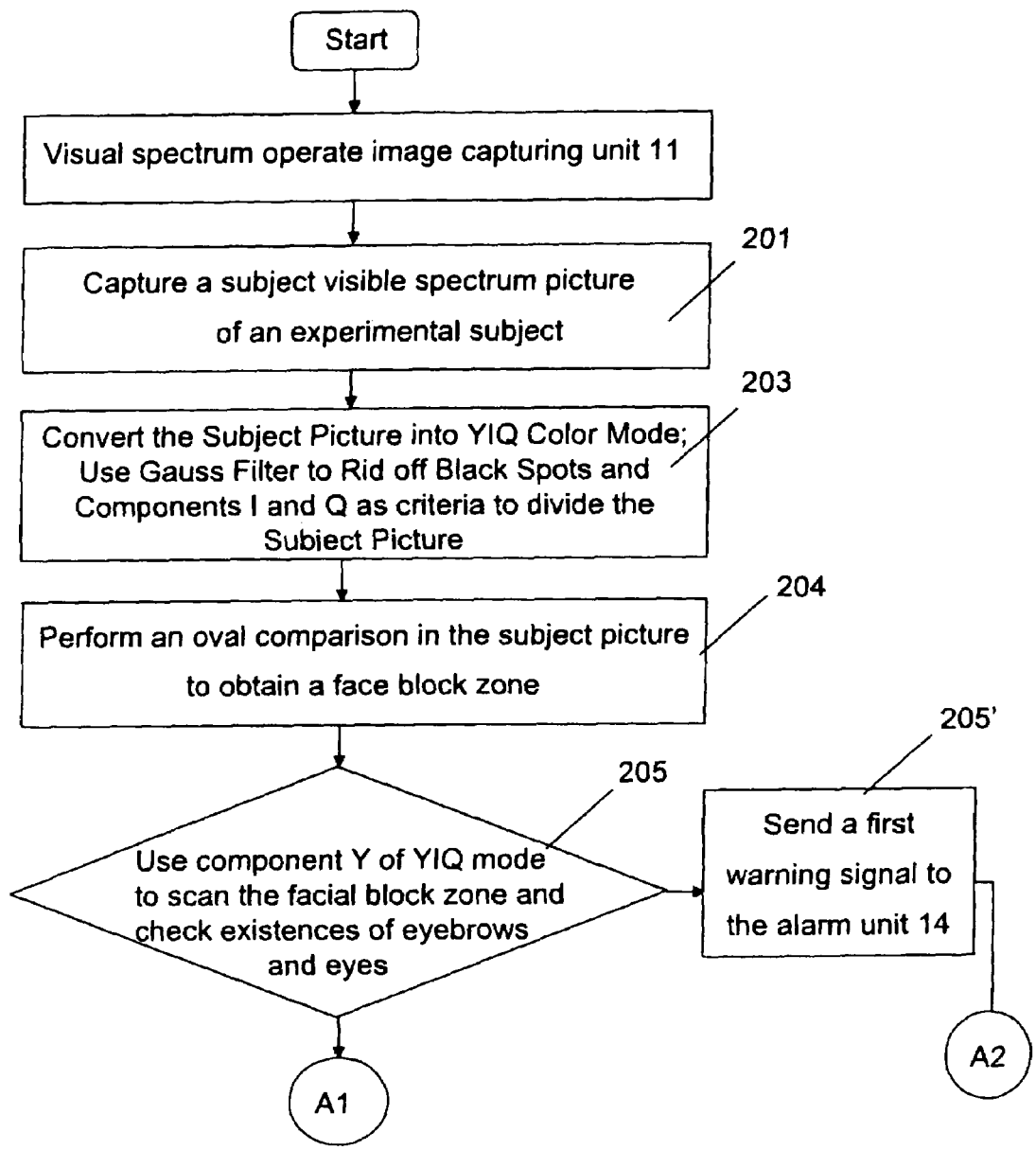
FIGS. 2A and 2B are flow diagrams according to the preferred embodiment of the present invention.
Figure 2B:
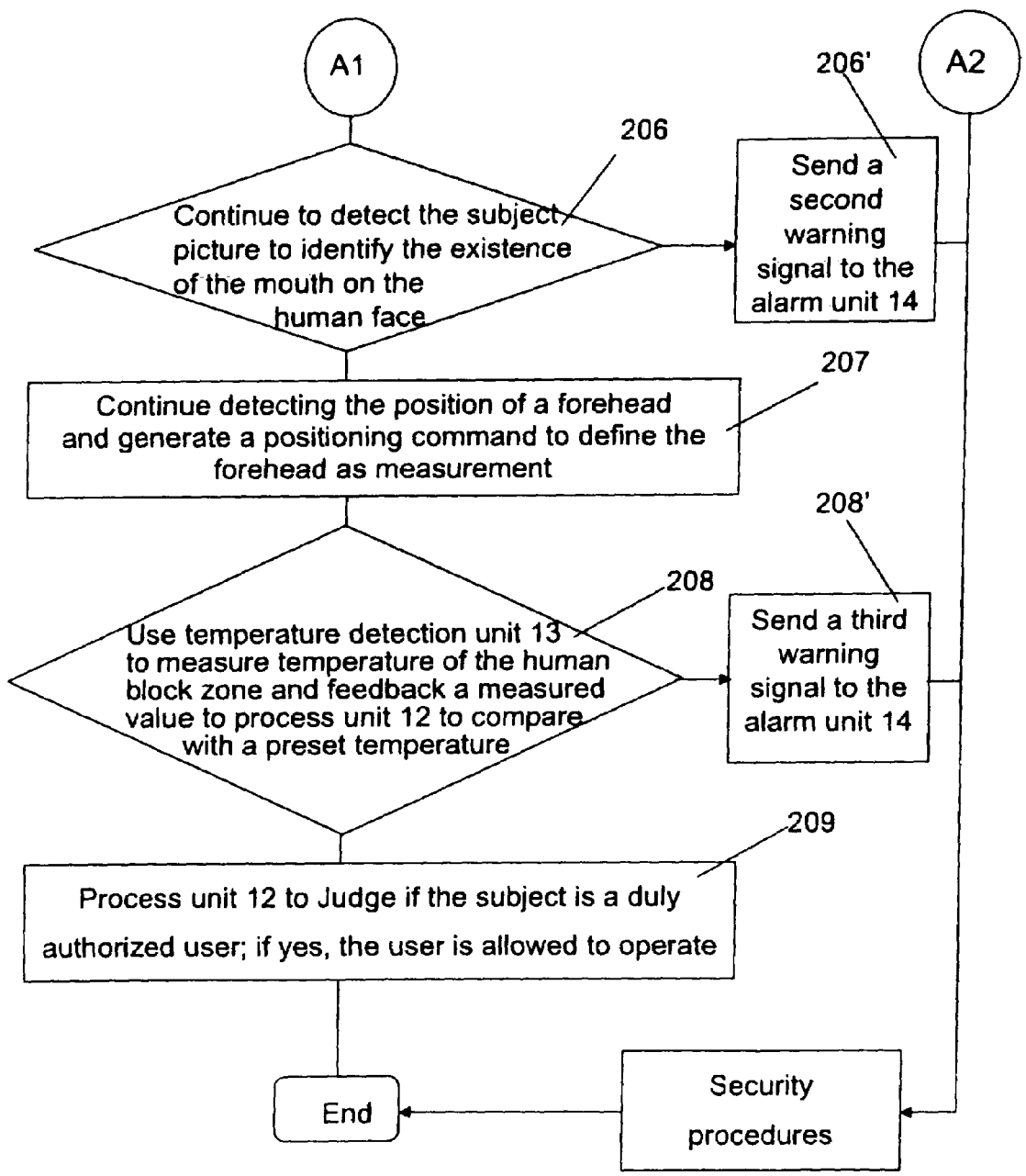

Referring to FIGS. 2A and 2B, the method of the present invention includes the steps of:

Carry on Step 201, wherein, the visual spectrum image capturing unit 11, for instance of a camera, and the alarm unit 14 is installed approaching an automatic teller machine (ATM). The visual spectrum image capturing unit 11 can provide with a lens protruded out of the ATM, so that the visual spectrum image capturing unit 11 is able to take a facial picture of a subject while in operation and thence transmit it to the process unit 12 for comparison. A warning signal created by the alarm unit 14 could be transmitted to a near end or a remote end through a network.

The subject picture is captured and stored in the format of RGB (Red-Green-Blue) color mode, and thereafter Step 203 is executed. Wherein, the process unit 12 functions to convert the subject picture from RGB color mode into YIQ color mode, by which Gauss filter serves to eliminate spots and components I and Q as the criteria serves to divide the subject picture for locating blocks of the skin color of the human face.

Herein, it is not restricted to YIQ mode. YUV and HSI color modes with less subjection of light are also applicable. In YUV mode, components U and V are used as the criteria to divide the subject picture; relatively, HSI mode, it is the components S and I as the criteria to divide the subject picture.

It is well noted in YIQ color mode that Y stands for "Luminance", I stands for "Inphase", and Q stands for "Quadrature". Such mode primarily applies to a signal communication of a color cabled TV system.

YUV color mode adopted by European TV system belongs to a PAL system, in which Y stands for "Luminance", namely gray scale value, and U and V stands for "Chrominance", namely the attributes of the color and the saturation of the image. In addition, in HSI color mode, H stands for "Hue", S stands for "Saturation", and I stands for "Intensity".

After establishing the blocks of the skin color, Step 204 continues to perform an oval comparison for more precisely ascertaining the possible position of the subject human face in the subject picture and hence obtaining a block zone of the human face.

Thereafter, Step 205 goes on. Wherein, the process unit 12 utilizes the component Y of YIQ color mode to scan the block zone of the human face starting from an upper boundary and moving downwardly to determine whether the presences of eyebrows and eyes are on the preceding human face. Moreover, if the YUV mode is experienced, the component Y is searched; if the HSI mode is experienced, the component H is searched.

In regard to the judgment, it is considered that the facial features would be the most prominent under the component Y in YIQ color mode, the component Y in YUV mode, or the component H in HSI mode. Therefore, the application of the component Y has the property of searching the areas where eyebrows and eyes are located, namely where black spots are symmetrically parallel to converge throughout the block zone. If it is failure to tell the convergence of those block spots, the process unit 12 would then conclude the absence of the facial features in the block zone of the human face. The possibility of such failure may be caused by covering the eyes of the subject with a shelter. At present, the subject would not be duly authorized to operate ATM, instead, Step 205' further goes on that the process unit 12 would generate a first warning signal to the alarm device 14 so as to activate a subsequent security response. Contradictorily, if it is normal to determine the black spots, Step 206 would be further proceeded, as shown in FIG. 2B.

Similarly, in Step 206, the process unit 12 keeps on detecting following relevant location in the block zone to see if the black blocks of the mouth are detected.

Failure to tell those of the mouth, the possibility of such failure may be as a result of the masked mouth, and Step 206' would be further proceeded, in which the process unit 12 would send a second warning signal to the alarm unit 14 to activate the subsequent security response.

If the location of the mouth is detected, the process goes to Step 207 for determining the position of a forehead and generating a positioning command to define the forehead as a measurement.

In Step 207, The process unit 12 continues to operate for locating the position of the forehead by inspecting the region between the location of the eyes or eyebrows and an upper margin of the block zone of the human face associating with a central place amongst a left and a right boundaries of the block zone, thereby gaining the preliminary position of the forehead in the block zone.

In Step 208, the process unit 12 renders the temperature detection unit 13 measuring the temperature of the block zone of the human face in accordance with the positioning command and hence generates a measured temperature.

The temperature detection unit 13 could be an infrared thermometer, a body surface temperature sensing device, or other appropriate means, and the preceding one is adopted in the preferred embodiment.

Subsequently, the measured temperature is in turn transmitted to the process unit 12 for comparing with a predetermined temperature which is a facial temperature and is near the human body temperature in the range from 35° C. to 40° C. If the temperature resulting from the comparison is not within the range of the predetermined temperature, Step 208' would be carried on that the process unit 12 would transmit a third warning signal to the alarm unit 14 for activating the subsequent security response.

In contrast, Step 209 continues when the measured temperature is available detected within the aforementioned range. In step 209, the process unit 12 accordingly determines whether the experimental subject has the mask on his face. If a determination of the absence of the mask is true, the subject is deemed a legally authorized user to allowably operate the ATM.

Therefore, the present invention is characterized to identify respective positions of the eyebrows, the eyes, and the mouth of the subject face and further to accompany with the detection of the facial temperature, thereby efficiently judging whether the subject face is a genuine human face.

Specifically, when the first, the second, and the third warning signals are forwarded to the alarm unit 14, the preset security response in conjunction with the present invention could be triggered to create proper actions, for example to transmit the signals to a near end or a remote end through a network, to directly dial the police or transmit a message to the manager and the manager center for the duty police to have sufficient time to rush to the scene, and to make an audibly deterring sound at that conjuncture.

Thus, when the experimental subject have a mask, a helmet, or a mouthpiece on, the process unit 12 would fail to recognize the primary facial features instance of the eyebrows, the eyes, and the mouth on a subject face, and the temperature detection unit 13 would fail to detect an adequate surface temperature of the face. Accordingly, the alertness of the alarm unit 14 or the audible deterrence thereof would facilitate to fend off the illegal user for the stated objectives and purposes of the present invention. Besides, it is also considered that such alarm unit operating in an active alarm or a direct dial is far safer than the manual operation of the alarm apparatus. The manager may release the alarm once the subject is deemed devoid of threats.

It is not restrict to method of generating the subject picture in Step 201, a sensor may be alternatively installed at a preset location to activate the visual spectrum image capturing unit 11, so that the captured picture may be applied as the subject picture to further continue the subsequent steps.

While we have shown and described the embodiment in accordance with the present invention, it should be clear to those skilled in the art that further embodiments may be made without departing from the scope of the present invention.

What is claimed is:

1. A method for prohibiting a person with a facial mask to operate an automatic teller machine, comprising the following steps of:
    a. arranging a visual spectrum image capturing unit and an alarm unit approaching an automatic teller machine (ATM);
    b. capturing a subject visible spectrum picture of an experimental subject via said visual spectrum image capturing unit;
    c. judging if said subject picture shows generic features of a human face; if said face features are recognized as false, it then directly goes to Step g.;
    d. if said face features are recognized as true, a facial temperature of the subject is detected to gain a measured temperature;
    e. comparing said measured temperature with a predetermined reference temperature; if said measured temperature resulting from the comparison fails to be within a range of said reference temperature, it is determined as a spurious human face and then directly proceeds said Step g.;
    f. if said measured temperature resulting from the comparison is within the range of said reference temperature, it is determined as a genuine human face and said ATM is allowably operated without proceeding said Step g.; and
    g. triggering said alarm unit to transmit a warning signal without operating the ATM.

2. The method as claimed in claim 1, wherein, said Step b. serves to sense said experimental subject for generating said subject picture and thence to perform an oval comparison in accordance with said subject picture, by which a block zone of a human face is presented for said Step c. to identify whether said block zone of said subject picture includes facial features of a genuine human face.

3. The method as claimed in claim 1, wherein, said Step c. includes the following steps of:
    c1. converting said subject picture into YIQ color mode;
    c2. performing an oval comparison in accordance with said subject picture and creating a block zone of a human face;
    c3. applying a component Y of said YIQ color mode to substantially measure locations of eyebrows and eyes within said block zone of said human face; and
    c4. carrying on said Step g. while failing to obtain said locations of said eyebrows and said eyes.

4. The method as claimed in claim 1, wherein, said Step c. includes the following steps of:
    c1. converting said subject picture into YUV color mode;
    c2. performing an oval comparison in accordance with said subject picture and creating a block zone of a human face;
    c3. applying a component Y of said YUV color mode to substantially measure locations of eyebrows and eyes within said block zone of said human face; and
    c4. carrying on said Step g. while failing to obtain said locations of said eyebrows and said eyes.

5. The method as claimed in claim 1, wherein, said Step c. includes the following steps of:
    c1. converting said subject picture into HSI color mode;
    c2. performing an oval comparison in accordance with said subject picture and creating a block zone of a human face;
    c3. applying a component H of said HSI color mode to substantially measure locations of eyebrows and eyes within said block zone of said human face; and
    c4. carrying on said Step g. while failing to obtain said locations of said eyebrows and said eyes.

6. The method as claimed in claim 1, wherein, said warning signal in said Step g. is alternatively transmitted to a near end or a remote end through a network.

* * * * *